Feb. 16, 1932.    C. SAUZEDDE    1,845,345
TAIL WHEEL
Filed April 8, 1929    2 Sheets-Sheet 1

Inventor
Claude Sauzedde,
By
Attorneys

Feb. 16, 1932. C. SAUZEDDE 1,845,345
TAIL WHEEL
Filed April 8, 1929 2 Sheets-Sheet 2

Inventor
Claude Sauzedde,
By
Attorneys

Patented Feb. 16, 1932

1,845,345

UNITED STATES PATENT OFFICE

CLAUDE SAUZEDDE, OF DETROIT, MICHIGAN, ASSIGNOR TO DETROIT HYDROSTATIC BRAKE CORPORATION, A CORPORATION OF MICHIGAN

TAIL WHEEL

Application filed April 8, 1929. Serial No. 353,372.

The present invention pertains to a novel tail wheel constructed particularly for use in connection with aeroplanes, and the principal object is to provide a device of this characters that prevents ground loops.

The usual tail wheel at the tail end of an aeroplane is mounted in a fork which is adapted to turn on a substantially vertical axis with respect to the fuselage. If the wheel strikes an obstacle on the ground during landing, it is deflected into a plane angular to the longitudinal axis of the craft. The wheel therefore describes an arc along the ground carrying with it the rear end of the aeroplane. This movement of the rear end is known as the ground loop which often results in serious damage to the aeroplane and is therefore considered to be one of the greatest hazards in landing.

The present invention aims to overcome ground looping by providing a tail wheel which is automatically braked at the incipiency of any deflecting movement towards either side of the axis. A tail wheel thus deflected and braked will act as a drag on the coasting travel of the aeroplane or will tend to right itself into alignment with the axis of the craft.

The invention is fully disclosed by way of example in the following description and in the accompanying drawings in which—

Reference to these views will now be made by use of like characters which are employed to designate corresponding parts throughout.

Figure 1:
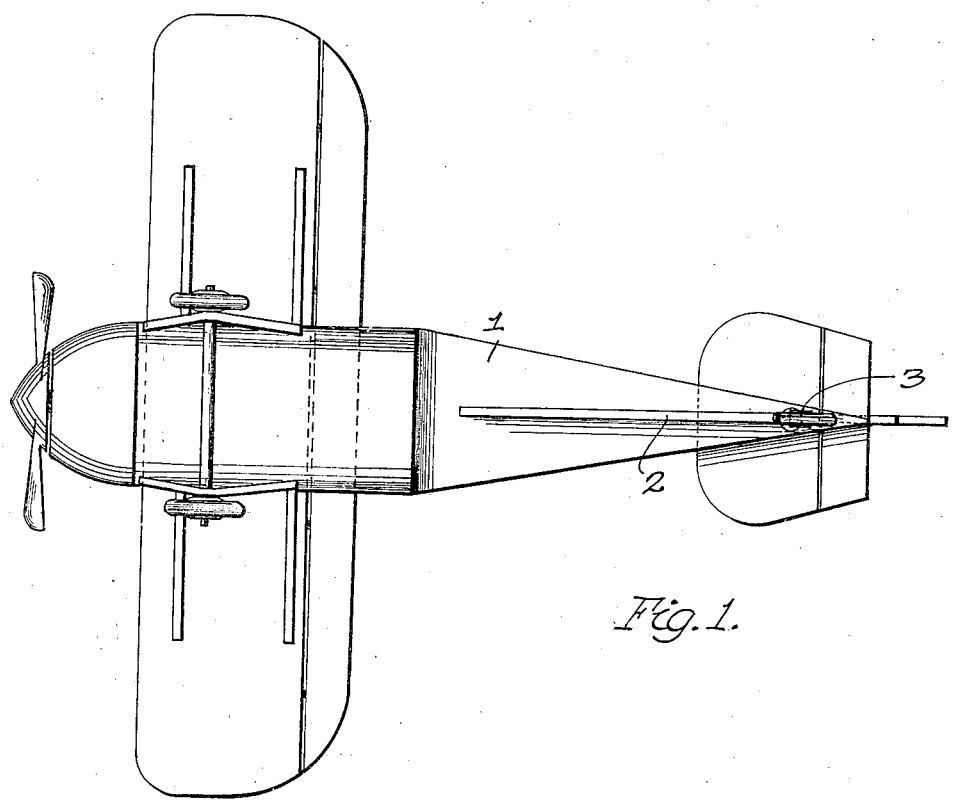
Figure 1 is a bottom plan view of an aeroplane equipped with a tail wheel according to the invention.
Figure 2:
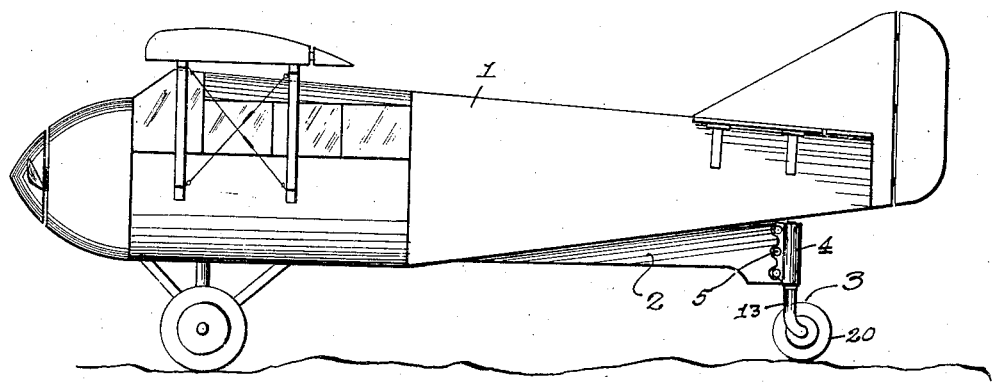
Fig. 2 is a side elevation thereof.
Figures 3, 4:
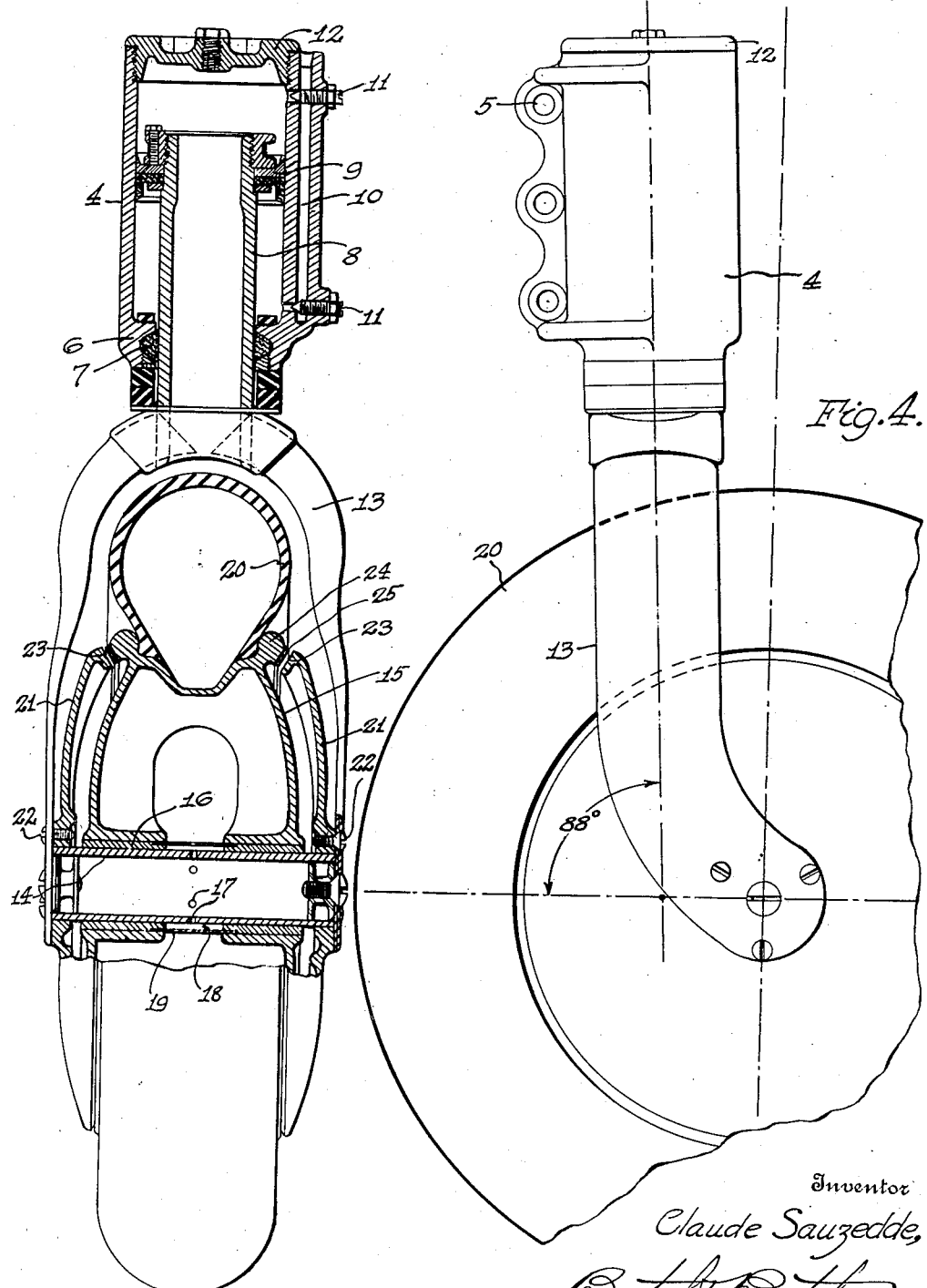
Fig. 3 is a vertical transverse section of the wheel assembly.
Fig. 4 is a side elevation thereof.

In Figs. 1 and 2 is illustrated the body or fuselage 1 of a conventional aeroplane, at the bottom of which is provided a longitudinal fin 2 equipped with a tail wheel designated in general by the numeral 3.

The tail wheel assembly includes a cylindrical member 4 having ears 5 for attachment to the rear end of the fin 2. The bottom or lower end of the cylindrical member is restricted at 6 and provided with packing material 7 to form a sliding and tight fit around the stems 8 passed therethrough and into the cylinder. To the upper end of the stem is secured a piston 9 which slides in contact with the inner wall of the cylinder. The cylinder is further equipped with an exterior by-pass 10 establishing fluid communication between the ends thereof, and into the ends of the by-pass are threaded screw valves 11 for controlling the rate of flow therethrough. The upper end of the cylinder is finally closed by a cap 12, which when removed, permits the cylinder to be filled with a suitable fluid.

A fork 13 is secured to the lower end of the stem 8 outside the cylinder and has a hollow axle 14 secured across the free ends of the tines. On the axle is rotatably mounted a suitable wheel 15, with the interposition of bearing metal 16. It will be seen that the transverse axis of the wheel is shorter than the axle 14, so that the wheel is adapted to slide laterally on the axle. The axle is formed with oil apertures 17 at the center thereof, and bearing 17 is open at 18 in communication with the apertures and covered by a sleeve 19 to form an annular oil pocket. The wheel is equipped with a tire 20, and it will be seen that the fork is of such dimensions as to accommodate the wheel and tire.

To the inner sides of one of the wheel-carrying members, and preferably to the fork fingers are secured brake elements such as lateral and fixed shoes 21. These may be retained by means such as screws 22 or other suitable fastening elements. The shoes are assembled around the ends of the axle 14 as centers and therefore concentric with the wheel 15. The shoes are shown as each formed at the periphery with a conical surface 23 which slopes inwardly of the fork. Adjacent these surfaces, the wheel 15 is formed with circular ribs 24 on or near the rim thereof. Each such rib carries a brake element such as a band 25 movable therewith and disposed adjacent to, and normally spaced slightly from one of the surfaces 23. The oppositely facing lateral bands 25 have their exposed faces substantially parallel to the surfaces 23 so that axial relative movement thereof, in either direction assures a braking effect. If desired, an axis common to the cylinder 4 and a portion of the fork 13 may be inclined slightly forwardly to form an angle of 88 degrees with the horizontal at the forward side in order to provide a castor effect in trailing. The fluid in the cylinder 4 adapted to be forced by the piston 9 through comparatively small apertures in the by-pass 10 functions as a cushion when the wheel strikes the ground.

In the normal position of the wheel, there is sufficient clearance between the bands 25 and the brake shoes to avoid braking action. If the wheel should be deflected by striking an obstacle on the ground, there will be contact and lateral pressure between the surface 23 and the strip 25 at the side towards which the deflection takes place. This contact obviously tends to check rotation of the wheel and therefore tends to bring all parts to a normal position with said wheel advancing in a plane parallel to the axis of the aeroplane or the line of the vehicular advance due to the resistance at the side where braking contact has been made. Also, advance of the wheel in the direction of deflection will be checked so that the usual dangerous ground loop is avoided.

Although a specific embodiment of the invention has been illustrated and described, it will be apparent that various alterations in the details of construction may be made without departing from the scope of the invention as indicated by the appended claims.

What I claim is:—

1. A tail wheel comprising a carrier member, a wheel member so journaled therein as to permit a lateral movement between said carrier and said wheel, opposite lateral brake shoes fixed against rotation relatively to said carrier member and disposed adjacent the respective sides of said wheel, and friction members laterally carried by said wheel on the respective sides thereof and engageable with said shoes upon such lateral relative movement, in either direction.

2. A tail wheel comprising a carrier member, an axle mounted in said carrier member, a wheel member slidably and rotatably mounted on said axle, opposite lateral brake shoes fixed to said carrier member, and friction members laterally carried by said wheel and engageable with said shoes.

3. A tail wheel comprising a fork, an axle mounted in said fork, a wheel member slidably and rotatably mounted on said axle, brake shoes fixed to said fork, and friction members carried by said wheel and engageable with said shoes.

4. A tail wheel comprising a carrier member, a wheel member rotatably and slidably mounted therein, and cooperating brake members carried by said carrier and wheel members.

5. A tail wheel comprising a fork, an axle mounted therein, a wheel member slidably and rotatably mounted on said axle and cooperating brake members carried by said axle and brake members.

6. In combination: an axle; a ground wheel mounted for both rotation and lateral movement thereon; and means rendering one of said movements effective to check the other of said movements.

7. In combination: an axle; a ground wheel mounted thereon; brake means including a pair of brake elements fixed against rotation relatively to said axle; a pair of oppositely facing brake elements disposed at the respective sides of said wheel and concentrically of said axle; and supporting means permitting axial movement between said pairs of brake elements.

8. In combination: an axle; a ground wheel mounted thereon; and brake means including brake elements respectively fixed relatively to said axle, and oppositely facing brake elements secured on said wheel; and supporting means permitting axial relative movement between a fixed brake element and one of said oppositely facing brake elements.

9. In combination: an axle; a ground wheel mounted for rotation and lateral movement thereon; and means rendering lateral movement of said wheel effective to check the rotation thereof.

10. In combination: a wheel; an axle element longitudinally slidable relatively thereto; castoring fork element supporting said axle element; and cooperating means, upon said wheel and upon one of the mentioned elements, for producing a braking effect upon an application of lateral pressure to said wheel.

11. In combination: a wheel comprising a rim; outwardly facing brake elements carried by said rim; additional brake elements disposed opposite said brake elements and alternatively engageable by the mentioned brake elements; and supporting means permitting relative axial movement between said wheel and said brake elements.

12. In combination: a tail wheel; a brake therefor; and supporting means permitting a lateral movement of said wheel and rendering such lateral movement effective in the application of said brake.

13. In combination: a ground wheel comprising a rim having symmetrically disposed conical lateral brake surfaces; cooperating conical brake elements disposed concentrically therewith on opposite sides of said wheel; and means for so supporting said wheel and said brake elements as to permit axial movements of engagement and disengagement therebetween.

In testimony whereof I affix my signature.

CLAUDE SAUZEDDE.